Patented May 1, 1945

2,375,162

UNITED STATES PATENT OFFICE 2,375,162

THERMOPLASTIC COMPOSITION

Joseph F. Zemaitis, Waterbury, Conn., assignor to Dispersions Process, Inc., New York, N. Y., a corporation of Delaware No Drawing. Application May 31, 1940,
Serial No. 338,225

4 Claims. (Cl. 260—752)

This invention relates to thermoplastic rubber-wax compositions, more particularly rubber-wax compositions containing at least 15% rubber, and method of making same.

Rubber-wax compositions for adhesive purposes and for coating or laminating sheet material have been produced by incorporating finely divided rubber in molten wax. Where small amounts of rubber, up to 10% for example, are incorporated in the composition, the tensile and adhesive strength, and flexibility of a film of the rubber-wax composition are not sufficiently increased over the wax composition without the rubber to be of practical value where a strong thermoplastic film is desired. Where more than 15% of rubber is incorporated in the wax compound by mixing the rubber in the molten wax at sufficiently low temperatures to preclude deterioration of the rubber by heat, for example, below 260° F., the operation takes an excessively long time, and is generally a matter of several hours. According to the prior Pratt Patent 1,762,194, which is assigned to the present assignee, rubber may be dispersed in wax by first incorporating water and a colloidal dispersing agent such as glue, colloidal clay, albumen, or casein in a plasticized rubber mass, drying out the water during the compounding or kneading process which incorporates the colloidal dispersing agent in the rubber, and thereafter mixing the rubber containing the dispersing agent with the wax, whereupon the rubber becomes uniformly dispersed in the wax. This process is time consuming in the step of drying out the water added with the colloidal dispersing agent, and excessively so in the case of reclaimed rubber where much less milling is necessary to break down the rubber to the extent necessary for incorporating in the wax medium. Further, the hydrophilic colloidal dispersing agents remaining in a rubber-wax composition prepared by this method may detrimentally reduce the waterproof or moisture-proof properties of the composition. By the present invention, which is an improvement over the invention of the Pratt Patent 1,762,194, rubber may be dispersed in wax compounds by means of water-insoluble material, in which case the final product will contain no water-soluble or water-absorbent material as a result of the addition of the dispersing agent which would lessen the water-proofing or moisture-proofing qualities of the rubber-wax composition.

In carrying out the present invention, the rubber is dispersed in the wax by means of a polyvalent-metal soap. The rubber is plasticized in any desired manner, as by breaking down on a mill, the polyvalent-metal soap added thereto, and the wax and other ingredients intimately mixed with the plasticized rubber mass, as in an internal mixer, such as a Werner & Pfleiderer, whereupon the rubber becomes dispersed in the wax composition. The amount of rubber should be at least 15% of the final composition in order that it will have the desired tensile and adhesive strength, and flexibility. The rubber content of the composition may be as high as 40% or more, but the amount of wax in the compound should be at least equal to the rubber content. The rubber and wax together should comprise at least a major proportion of the composition, and may be in predominating proportion, for example, 75% or more of the composition, or, if desired, the rubber and wax may comprise substantially the whole of the composition with the exception of the polyvalent-metal soap dispersing agent. In order to readily disperse the rubber in the wax medium, the amount of polyvalent metal soap should be at least 5 parts per 100 parts of rubber and is preferably in the range of 5 to 25 parts per 100 parts of rubber. The composition may contain vulcanizing and compounding ingredients for the rubber component, and other substances compatible with the wax for imparting various qualities to the rubber-wax composition, such as gums, bitumens, plasticizers, and natural or synthetic resins, for example, rosin, ester gum, cumarone resin, phenol-aldehyde resin, urea resin, alkyd resin, polystyrene resin, acrylic resin. Rubber compounding ingredients may be incorporated in the rubber before dispersing in the wax. The other materials compatible with the wax should be in amount less than the wax to retain the desired thermoplastic properties and may be added in small amounts with the wax or may be added to the wax prior to mixing with the plasticized rubber mass. If desired, the rubber in which the polyvalent metal soap has been incorporated may be added to the wax at room or elevated temperature, but it is preferred to add the wax and other materials in which the rubber is to be dispersed to the plasticized rubber mass in an internal mixer in small additions. The wax content of the composition may be mineral, vegetable, animal, or synthetic wax or a mixture of various waxes. For example, the wax content may comprise paraffin wax, ceresin wax, the so-called amorphous or micro-crystalline waxes derived from petroleum, carnauba wax, candelilla wax, spermaceti, bees wax, and various other waxes. The soap may be a zinc, calcium, magnesium, aluminum or other polyvalent metal soap of any soap-forming acid, for example, a stearate, abietate, linoleate, or the like. The rubber may be crude or reclaimed natural rubber. Synthetic rubbers, rubber substitutes and other rubber-like materials, are equivalent to natural rubber in the present invention as used herein.

As illustrative of the present invention, the following examples of various thermoplastic rubber-wax compositions and their preparation are included.

Example 1

| | Parts by weight |
|---|---|
| Pale crepe rubber | 100 |
| Zinc stearate | 10 |
| Paraffin wax (M. P. 130–132° F.) | 200 |
| Amorphous wax (M. P. 152–155° F.) | 200 |

The pale crepe rubber was plasticized by milling on conventional mill rolls until broken down sufficiently to become smooth, after which the zinc stearate was added. The rubber mass was then transferred to a Werner & Pfleiderer mixer where most of the paraffin was added in small amounts at a temperature below the melting point of paraffin, after which the temperature was raised to above the melting point of paraffin and the remaining paraffin wax and the amorphous wax added to form a homogeneous dispersion.

Example 2

| | Parts by weight |
|---|---|
| Reclaim rubber | 100 |
| Zinc stearate | 10 |
| Amorphous wax (M. P. 152–155° F.) | 300 |
| Alkyd resin (M. P. 85° C.) | 20 |

The reclaim rubber was plasticized on a mill until smooth and the zinc stearate was then added and the milling continued until the zinc stearate was completely distributed throughout the batch. The mixture was then transferred to a Werner and Pfleiderer mixer where most of the wax was added in small amounts at a temperature below the melting point of the wax, after which the temperature was raised to above the melting point of the wax and the remaining wax and the resin added to form a homogeneous dispersion.

Thermoplastic rubber-wax compositions prepared according to the process of the present invention may be used as heat-sensitive adhesives, pressure-sensitive adhesives, and for coating or impregnating sheet material such as cloth, paper, foil, Cellophane, and the like, or laminating such sheet materials with plies of the same or different kind. Such coated and laminated sheet materials may be used for packaging and wrapping various materials, and for the manufacture of containers, cartons, boxes, and the like. Thermoplastic rubber-wax compositions may be used as water-proof coatings, moisture-proof coatings, and for electrical insulation purposes.

In view of the many changes and modifications that may be made without departing from the principles underlying the invention, reference should be made to the appended claims for an understanding of the scope of the invention.

Having thus described my invention, what I claim and desire to protect by Letters Patent is:

1. A process of making a thermoplastic composition containing rubber and wax which comprises dispersing a plasticized rubber mass containing 5 to 25 parts polyvalent metal soap per 100 parts rubber in a non-aqueous medium comprising a major proportion of wax, said wax being in amount at least equal to the rubber, the amount of rubber in the thermoplastic composition being at least 15%, and the rubber and wax comprising a major proportion of said composition.

2. A process of making a thermoplastic composition containing rubber and wax which comprises dispersing a plasticized rubber mass containing 5 to 25 parts polyvalent metal soap per 100 parts rubber in a non-aqueous medium comprising a major proportion of wax, said wax being in amount at least equal to the rubber and also comprising material from the group consisting of natural and synthetic resins, the amount of rubber in the thermoplastic composition being at least 15%, and the rubber and wax comprising a major proportion of said composition.

3. A process of making a thermoplastic composition containing rubber and wax which comprises preparing a plasticized rubber mass containing 5 to 25 parts polyvalent metal soap per 100 parts rubber and thereafter mixing the plasticized rubber mass with a non-aqueous medium comprising wax in amount at least equal to the rubber, the amount of rubber in the thermoplastic composition being at least 15%, and the rubber and wax comprising a major proportion of said composition.

4. A process of making a thermoplastic composition containing rubber and wax which comprises preparing a plasticized rubber mass containing 5 to 25 parts polyvalent metal soap per 100 parts rubber and thereafter mixing the plasticized rubber mass with a non-aqueous medium comprising wax in amount at least equal to the rubber and also comprising material from the group consisting of natural and synthetic resins, the amount of rubber in the thermoplastic composition being at least 15%, and the rubber and wax comprising a major proportion of said composition.

JOSEPH F. ZEMAITIS.